3,244,705
TRIPHENYLHALOETHYLENE DERIVATIVES
Frank P. Palopoli, Cincinnati, and Vernon J. Feil, Glendale, Ohio, assignors to Richardson-Merrell Inc., New York, N.Y., a corporation of Delaware
No Drawing. Filed Nov. 14, 1962, Ser. No. 237,718
9 Claims. (Cl. 260—247)

This invention relates to triphenylhaloethylene compounds. In a particular aspect this invention relates to aminoalkyl-substituted triphenylhaloethylene derivatives which have properties suitable for use in the prevention and treatment of gynecological abnormalities.

The novel compositions of the present invention correspond to the general formula:

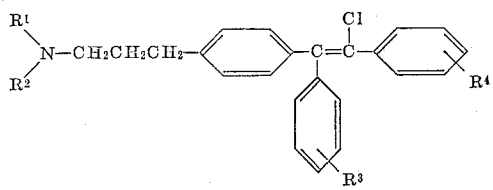

wherein $R^1$ and $R^2$ are selected from the group consisting of hydrogen, lower alkyl containing from 1 to 4 carbon atoms, and $R^1$ and $R^2$ together with the nitrogen to which they are attached form a heterocyclic radical of the group consisting of piperidino and morpholino; and $R^3$ and $R^4$ are selected from the group consisting of hydrogen, halogen, lower alkyl, lower alkoxy, and trifluoromethyl.

Representative of the $R^3$ and $R^4$ groups are hydrogen, chlorine, bromine, fluorine, methyl, ethyl, propyl, butyl, isopropyl, methoxy, ethoxy, propoxy, isobutoxy, and trifluoromethyl.

The new haloethylenes of this invention can be generally prepared by halogenation of the corresponding ethylenes of the formula:

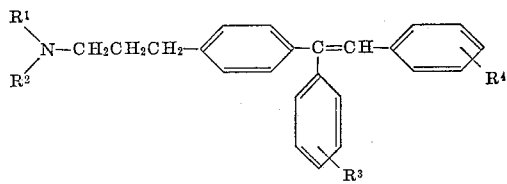

wherein the $R^1$, $R^2$, $R^3$, and $R^4$ substituents have the same meaning described above. These ethylenes are described in copending application Serial No. 42,994, filed July 15, 1960, now U.S. Patent No. 3,123,643.

The haloethylenes can be prepared by the halogenation of the ethylenes using chlorine or N-chlorosuccinimide. They can also be prepared by halogenation of the hydrochloride salt of the ethylenes with N-chlorosuccinimide.

The ethylene starting materials can be generally prepared by dehydration of the corresponding ethanols of the formula:

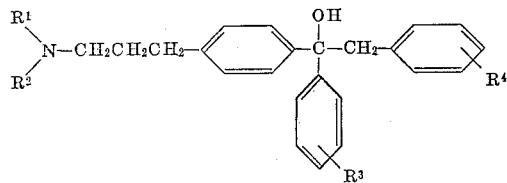

wherein the $R^1$, $R^2$, $R^3$, and $R^4$ substituents have the same meaning as above.

The dehydration is carried out by the use of acids such as hydrochloric acid, hydrobromic acid, p-toluenesulfonic acid, phosphoric acid, and the like.

Halogenation of the ethylenes may be accomplished with elemental chlorine or with chlorinating agents such as N-chlorosuccinimide. The ethylene compound to be halogenated is dissolved in an inert solvent such as carbon tetrachloride and chlorine can then be bubbled directly into the reaction mixture until the desired amount (about 5 percent excess) has been added. Alternatively, a solution of chlorine in an inert solvent such as carbon tetrachloride may be utilized for the reaction. The reaction temperature is not critical since halogenation may be effected from about —20° C. to the refluxing temperature of the solvent. The chlorine or solution of chlorine is usually added at from —20° C. to room temperature over a period of 15 minutes to 2 hours. After stirring for an additional 30 minutes to 2 hours, the reaction mixture is heated at reflux for a period of from 30 minutes to 2 hours.

The initial product of direct chlorination is dichloroethane derivative which can be isolated, if desired. Usually, the dichloroethanes are not stable and spontaneously eliminate hydrogen chloride to yield chloroethylene product. If the dichloroethane is isolated, it can be thermally decomposed by heating at from 40 to 150° C. to provide the chloroethylene product. After the reaction has been completed, the solvent is removed and the product is crystallized from butanone or from alcohol-ether mixtures.

When N-chlorosuccinimide is used to effect chlorination, the ethylene is dissolved in carbon tetrachloride and a suspension of N-chlorosuccinimide (10 percent excess) in carbon tetrachloride is added over a period of about 30 minutes to 2 hours at the refluxing temperature of the solvent. After the addition of the halogenating agent has been completed, the reaction mixture is refluxed an additional 4 to 24 hours. As the reaction proceeds, succinimide begins to separate and the reaction is usually complete within the times specified. After the reaction period an excess of 10 percent sodium hydroxide solution is added to the reaction mixture. The organic layer is separated, washed with water, and the product is then isolated in the usual manner.

The novel haloethylene derivatives of this invention can act as gonadotrophin inhibiting agents and are thereby useful for the treatment of fertility and sterility problems. They are active orally, parenterally, and topically and may be administered in any conventional manner in amounts ranging up to about 1.5 grams per day.

The following examples represent specific embodiments of the present invention:

EXAMPLE I

1-[p-(3-diethylaminopropyl)phenyl]-
1,2-diphenylchloroethylene

One mole of an ether solution of benzylmagnesium bromide was added to an ether solution of 1 mole of p-(3-diethylaminopropyl)benzophenone and stirred for 1 hour at room temperature. The Grignard complex was decomposed with a cold solution of ammonium chloride. The ether layer was separated, washed with water, and extracted with dilute acetic acid. The acid extracts were neutralized with 10 percent sodium hydroxide solution and the oil which separated, solidified, and was recrystallized from ether-hexane to give the intermediate ethanol, 1-[p-(3-diethylaminopropyl)phenyl] - 1,2 - diphenylethanol, which melted at 62 to 65° C. The ethanol was then dehydrated with alcoholic hydrogen chloride by warming on a steam bath for 4 hours. The solvent was then removed and the residue, 1-[p-(3-diethylaminopropyl)phenyl]-1,2-diphenylethylene hydrochloride, was used without further purification in the chlorination reaction.

A carbon tetrachloride solution containing 1.77 grams of chlorine was added to a solution of 10 grams of the above ethylene hydrochloride. The reaction was stirred at room temperature for 30 minutes; then refluxed for 1 hour. The solvent was removed by distillation and the residue crystallized from butanone to give 1-[p-(3-diethylaminopropyl)phenyl] - 1,2 - diphenyl-1,2-dichloroethane hydrochloride. The dichloroethane was heated at 140° C. for 20 minutes to give 1[p-(3-diethylaminopropyl)phenyl] - 1,2-diphenylchloroethylene hydrochloride. The hydrochloride salt was converted, via the free base, to the dihydrogen citrate salt melting at 120 to 123° C.

This compound has gonadotrophic inhibitory properties. Unlike many other agents, it shows preferential inhibition of individual pituitary gonadotrophins as evidenced by failure of this compound to decrease testes weight.

EXAMPLE II

*1-[p-(3-diethylaminopropyl)phenyl]-1- (p-tolyl)-2-(p-chlorophenyl)chloroethylene*

Employing the procedure of Example I, 1-[p-(3-dimethylaminopropyl)phenyl] - 1 - (p-tolyl)-2-(p-chlorophenyl)chloroethylene is produced by using p-(3-dimethylaminopropyl)-p'-methylbenzophenone and p-chlorobenzylmagnesium bromide as starting materials.

EXAMPLE III

*1-[p-(3-dibutylaminopropyl)phenyl]- 1,2-diphenylchloroethylene*

Employing the procedure of Example I, 1-[p-(3-dibutylaminopropyl)phenyl]-1,2 - diphenylchloroethylene is produced by using p-(3 - dibutylaminopropyl)benzophenone and benzylmagnesium bromide as starting materials.

EXAMPLE IV

*1-[p-(3-diethylaminopropyl)phenyl]-1- (p-tolyl)-2-(p-chlorophenyl)chloroethylene*

Employing the procedure of Example I, 1- [p-(3-diethylaminopropyl)phenyl]-1-phenyl-2-(p - fluorophenyl)-yl)chloroethylene is produced by using p-(3-diethylaminopropyl)-p'-methylbenzophenone and p-chlorobenzylmagnesium bromide as starting materials.

EXAMPLE V

*1-[p-(3-diethylaminopropyl)phenyl]-1- (p-tolyl)-2-(p-methoxyphenyl)chloroethylene*

Employing the procedure of Example I, 1([p-(3-diethylaminopropyl)phenyl] - 1 - (p-tolyl)-2-(p-methoxyphenyl)chloroethylene is produced by using p-(3-diethylaminopropyl)-p'-methylbenzophenone and p - methoxybenzylmagnesium bromide as starting materials.

EXAMPLE VI

*1-[p-(3-diethylaminopropyl)phenyl]-1- phenyl-2-(p-fluorophenyl)chloroethylene*

Employing the procedure of Example I, 1([p-(3-diethylaminopropyl)phenyl]-1-phenyl-2-(p - fluorophenyl)-chloroethylene is produced by using p-(3-diethylaminopropyl)benzophenone and p-fluorobenzylmagnesium bromide as starting materials.

EXAMPLE VII

*1-[p(3-diethylaminopropyl)phenyl]-1-phenyl- 2-(m-trifluoromethylphenyl)chloroethylene*

Employing the procedure of Example I, 1-[p-(3-diethylaminopropyl)phenyl]-1-phenyl-2-(m - trifluoromethylphenyl)chloroethylene is produced by using p-(3-diethylaminopropyl)benzophenone and m-trifluoromethylbenzylmagnesium bromide as starting materials.

EXAMPLE VIII

*1[p-(3-diethylaminopropyl)phenyl]- 1,2-di(p-chlorophenyl)chloroethylene*

Employing the procedure of Example I, 1-[p-(3-diethylaminopropyl)phenyl]- 1,2-di(p-chlorophenyl)chloroethylene is produced by using p-(3-diethylaminopropyl)-p'-chlorobenzophenone and p-chlorobenzylmagnesium bromide as starting materials.

EXAMPLE IX

*1-[p-(3-morpholinopropyl)phenyl]- 1,2-diphenylchloroethylene*

Employing the procedure of Example I, 1-[p-(3-morpholinopropyl)phenyl]-1,2-diphenylchloroethylene is produced by using p-(3-morpholinopropyl)benzophenone and benzylmagnesium bromide as starting materials.

EXAMPLE X

*1[p-(3-piperidinopropyl)phenyl]- 1,2-diphenylchloroethylene*

Employing the procedure of Example I, 1-[p-(3-piperidinopropyl)phenyl] - 1,2-diphenylchloroethylene is produced by using p-(3-piperidinopropyl)benzophenone and benzylmagnesium bromide as starting materials.

What is claimed is:

1. A compound having the formula:

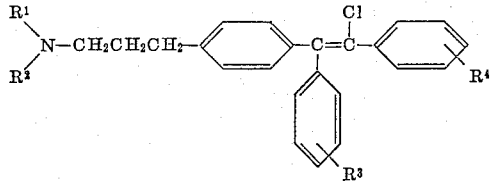

wherein $R^1$ and $R^2$ are selected from the group consisting of hydrogen, lower alkyl containing from 1 to 4 carbon atoms, and $R^1$ and $R^2$ together with the nitrogen to which they are attached form a heterocyclic radical of the group consisting of piperidino and morpholino; and $R^3$ and $R^4$ are selected from the group consisting of hydrogen, halogen, lower alkyl, lower alkoxy, and trifluoromethyl.

2. 1-[p-(3-diethylaminopropyl)phenyl]-1,2 - diphenylchloroethylene.

3. 1-[p-(3 - diethylaminopropyl)phenyl]-1-(p-tolyl)-2-(p-chlorophenyl)chloroethylene.

4. 1-[p-(3 - diethylaminopropyl)phenyl]-1-(p-tolyl)-2-(p-methoxyphenyl)chloroethylene.

5. 1-[p-(3-diethylaminopropyl)phenyl] - 1 - phenyl-2-(p-fluorophenyl)chloroethylene.

6. 1-[p-(3-diethylaminopropyl)phenyl] - 1 - phenyl-2-(m-trifluoromethylphenyl)chloroethylene.

7. 1-[p-(3-diethylaminopropyl)phenyl]-1,2 - di(p-chlorophenyl)chloroethylene.

8. 1-[p-(3-morpholinopropyl)phenyl] - 1,2 - diphenylchloroethylene.

9. 1-[p-(3-piperidinopropyl)phenyl] - 1,2 - diphenylchloroethylene.

References Cited by the Examiner

UNITED STATES PATENTS 2,430,891 11/1947 Shelton et al. _____ 260—570 X
2,567,351 9/1951 Rieveschl _____ 260—570 X

FOREIGN PATENTS 626,069 8/1961 Canada.

IRVING MARCUS, *Primary Examiner.*

NICHOLAS S. RIZZO, *Examiner.*